(12) United States Patent
Piana et al.

(10) Patent No.: US 6,739,791 B1
(45) Date of Patent: May 25, 2004

(54) SELF-ALIGNING CONNECTION DEVICE OF DETACHABLE TYPE

(75) Inventors: Alessandro Piana, Roccapietra di Varallo Sesia (IT); Christina Caprioli, Arona (IT)

(73) Assignee: Auges S.r.l.

( * ) Notice: Subject to any disclaimer, the term of this patent is extended or adjusted under 35 U.S.C. 154(b) by 0 days.

(21) Appl. No.: 10/110,845

(22) PCT Filed: Oct. 13, 1999

(86) PCT No.: PCT/IT99/00324

§ 371 (c)(1),
(2), (4) Date: Apr. 11, 2002

(87) PCT Pub. No.: WO01/26855

PCT Pub. Date: Apr. 19, 2001

(51) Int. Cl.[7] .................................................. F16D 1/00
(52) U.S. Cl. ..................... 403/296; 403/297; 403/322.2; 403/408.1; 411/354
(58) Field of Search ................................ 403/292, 294, 403/296, 297, 298, 322.1, 322.2, 321, 348, 349, 408.1; 411/354, 355, 389

(56) References Cited

U.S. PATENT DOCUMENTS

| | | | | |
|---|---|---|---|---|
| 4,127,345 A | * | 11/1978 | Angelosanto et al. | 403/388 |
| 4,131,376 A | * | 12/1978 | Busse | 403/12 |
| 4,701,065 A | * | 10/1987 | Orosa | 403/263 |
| 4,727,663 A | * | 3/1988 | Hahn | 37/458 |
| 4,743,138 A | * | 5/1988 | Goy | 403/337 |
| 4,775,269 A | * | 10/1988 | Brix | 408/239 R |
| 5,269,621 A | * | 12/1993 | De Bortoli et al. | 403/353 |
| 5,333,964 A | * | 8/1994 | Thomas | 403/339 |
| 5,788,400 A | * | 8/1998 | Wey | 403/329 |

FOREIGN PATENT DOCUMENTS

| | | |
|---|---|---|
| DE | 197 17 502 C | 10/1998 |
| EP | 0 391 807 A | 10/1990 |
| EP | 0 488 361 A | 6/1992 |
| EP | 0 547 049 B | 11/1993 |
| EP | 0 548 878 B | 3/1996 |
| FR | 2 179 800 A | 11/1995 |
| WO | WO 99 11411 A | 3/1999 |

* cited by examiner

*Primary Examiner*—Gary S Hartmann
(74) *Attorney, Agent, or Firm*—Gibbons, Del Deo, Dolan, Griffinger & Vecchione

(57) ABSTRACT

A self-aligning type of detachable rigid connection device having at least one main body endowed with a seat and at least one supported element endowed with a shank to be received into the seat of the main body. An actuator is provided for elastically deforming the shank and bringing at least two external surfaces of the same into close contact with the inside surface of the seat.

27 Claims, 5 Drawing Sheets

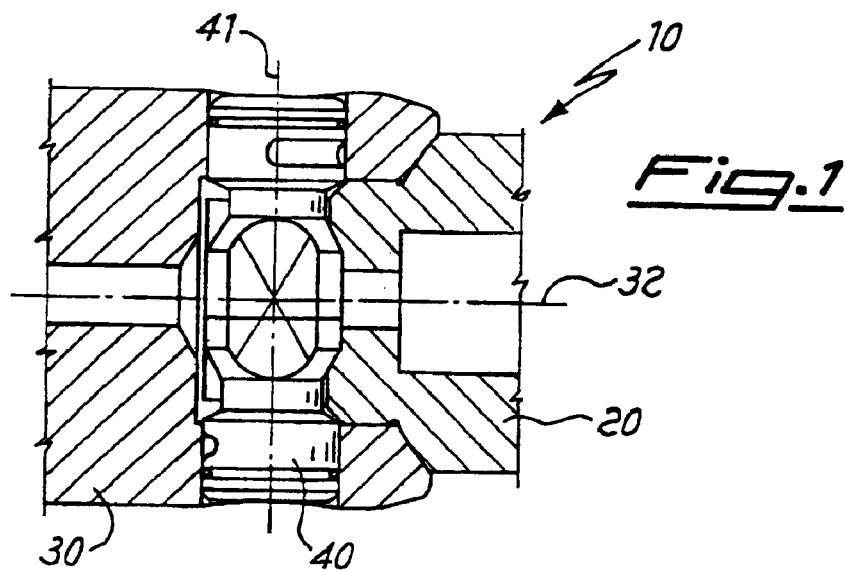
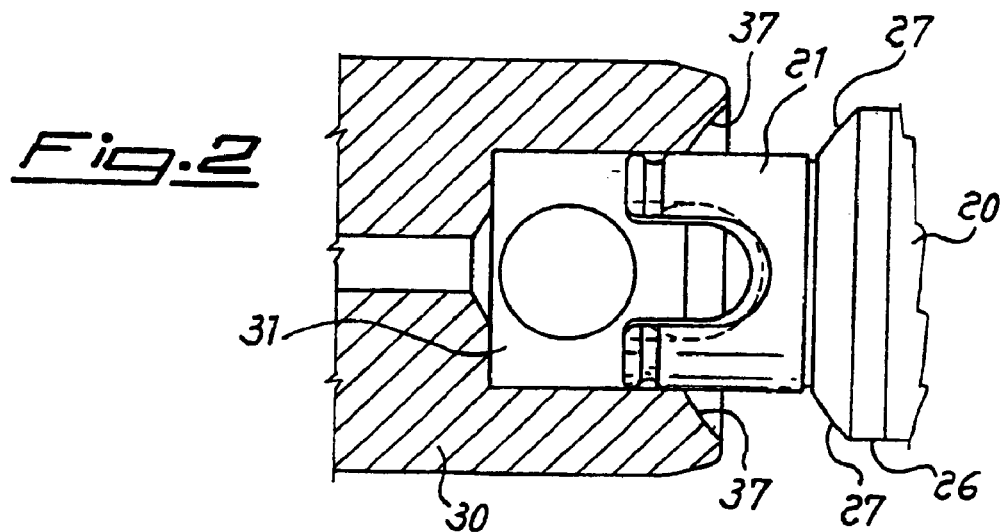
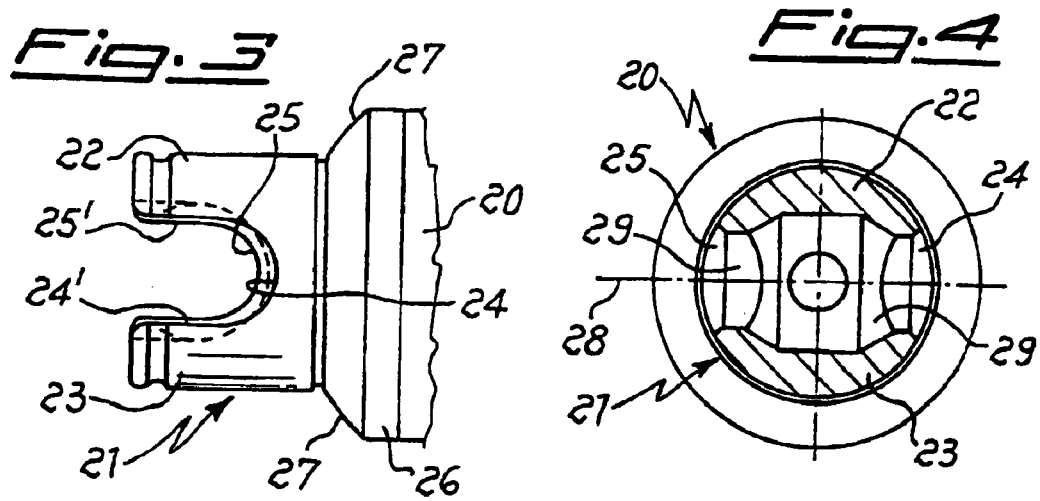

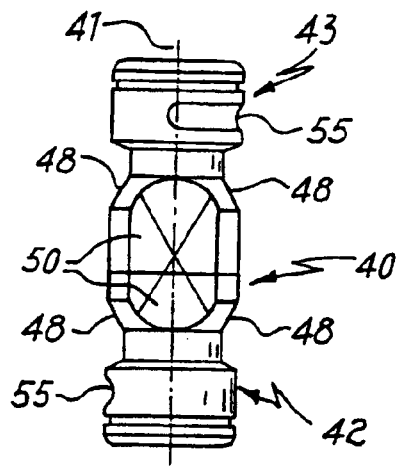
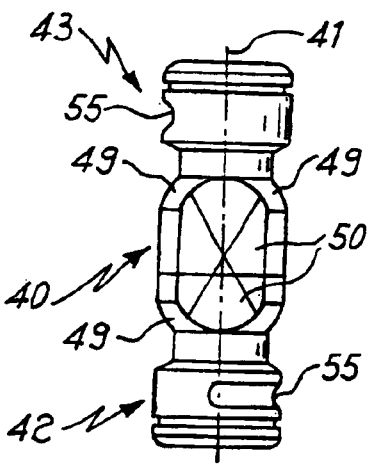
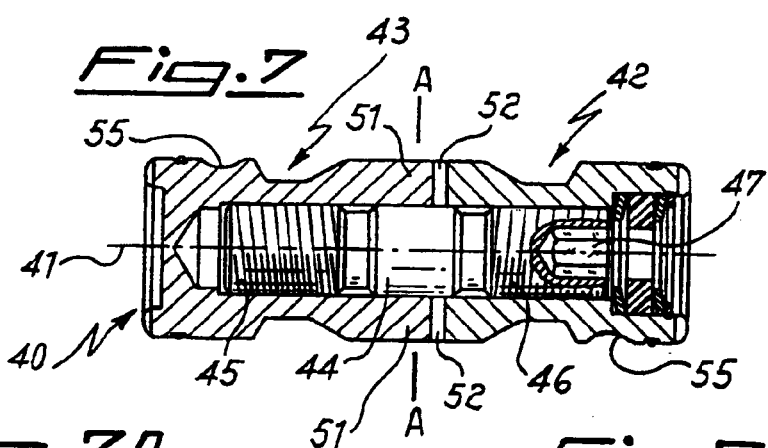
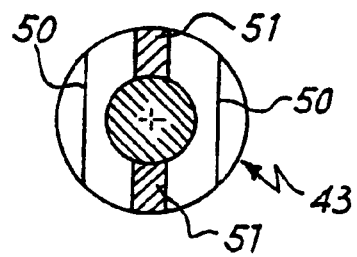
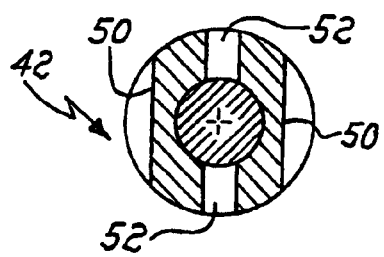
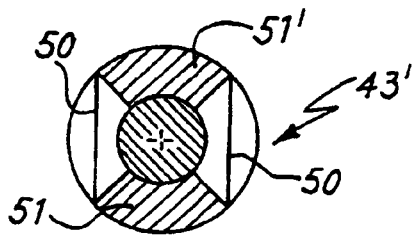
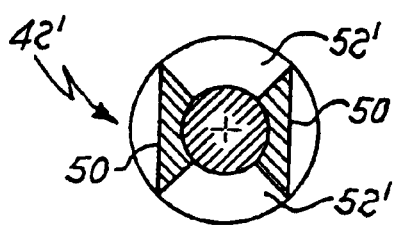

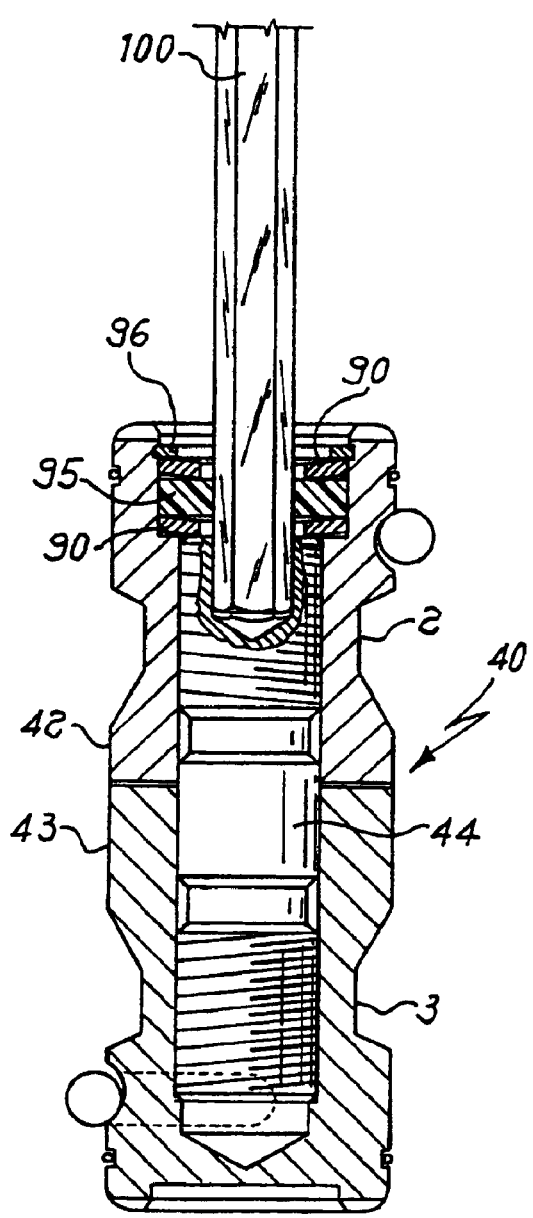 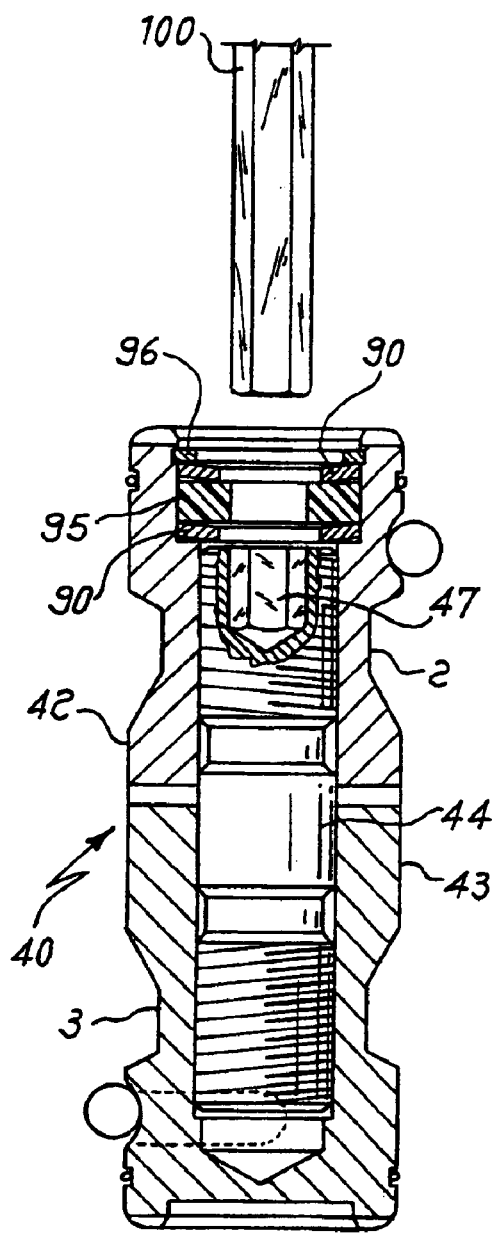

SELF-ALIGNING CONNECTION DEVICE OF DETACHABLE TYPE

TECHNICAL FIELD OF THE INVENTION

The present invention relates to a rigid rapid-connection device of the detachable and self-aligning type and, in particular, a device comprising at least one main body endowed with a seat and at least one supported element endowed with a shank fit to be received into the seat of the main body.

BACKGROUND OF THE INVENTION

Similar connection devices are known for instance for use in modular tooling assemblies destined for the machine-tools such as modular tool-carrier systems.

Independently of whether the tool is of the rotating or fixed type, the essential requirements of all these systems are precision in mounting the tool, repeatability of positioning the tool when the tool is again positioned on the machine after having been taken off the same, as well as stability of the axial and radial locking. Such modular tooling systems must also guarantee high rapidity in mounting and dismounting the tool.

An example of a similar device is described in the European Patent nr. EP-0548878 which relates to a device for connecting two cylindrical components in a precise way, the first of which, for instance a tool or an adapter, has an expandable transverse stem associated with it. The component to which the expandable stem is associated is inserted into a seat of a second component, for instance a basic holder, with the stem in retracted condition, until the same stem is brought into correspondence with at least one through hole to allow the stem to be extended. Once this position is reached, the stem is expanded to lock conical surface portions of the heads of the stem into corresponding recesses, also conical, in the second component.

One of the disadvantages of a similar system consists in necessarily requiring that each tool and each adapter be equipped with the expanding stem. Noting that the locking of the tool or adapter is effected by engaging the heads of the stem in corresponding recesses of the basic holder, all these elements necessarily require extremely accurate machining to assure precise positioning of the tool. Consequently, providing each tool and each adapter with an expanding stem is extremely expensive.

Another example, always related to the modular tooling systems, is described in European Patent nr. EP-0547049 which relates to a device for connecting two sections of a tool having a common axis. In this case, the shank of a tool or an adapter is endowed with a pin that has one extremity with a conical projection and the other extremity with a conical cavity. The basic holder into whose seat the shank is inserted is instead endowed with screws that have extremities respectively complementary to those of the pin. The locking of the screws causes the deformation of the seat of the basic holder.

This particular locking characteristic could result in not being very precise and could give rise to errors of positioning and to possible unbalancing of the system, a not inconsiderable drawback above all for the tools that rotate at high speed. This system offers a limited contact surface between shank and seat thus in fact limiting the maximum transmissible torque. Furthermore, the deformation of the seal of the basic holder can, over time, jeopardise the operation of the same basic holder.

In any case, these devices of known type are not in any way equipped with means to ensure the necessary safety of manipulation of the interconnected members and of the locking devices, in particular for the tools that, once the locking member has been loosened, could become detached from the basic holder and fall provoking damage or injury, above all in the case in which the tools are suspended and oriented with their extremity facing downward.

The object of the present invention is to propose a detachable connection device of the self-aligning type that ensures high precision of mutual positioning of the two elements interconnected without requiring particularly precise machining of the components and of the locking means.

Another object of the present invention is to propose a connection device of the detachable type that ensures high strength locking between two mutually connected elements.

A further object of the present invention is to propose a self-aligning connection device that is particularly rapid to operate both during the phase of connection of the two elements and during the phase of separation of the same.

Yet another object of the present invention is to propose a self-aligning connection device that offers high safety of manipulation of the mutually connected elements and of the locking devices.

DISCLOSURE OF THE INVENTION

According to the present invention, these objects are achieved by a rigid detachable connection device of a self-aligning type, comprising at least one main body endowed with a seat and at least one supported element endowed with a shank fit to be received into the seat of the main body, characterised by comprising means for elastically deforming the shank and for bringing at least two external surfaces of the same into close contact with the inside surface of the seat.

The uniform and symmetrical deformation of the shank of the supported element inside the seat of the main body guarantees above all high strength locking, maintaining simultaneously high precision of positioning without necessarily requiring machining within particularly narrow tolerances.

The shank and its respective seat are preferably cylindrical in shape and the means for elastically deforming the shank comprise in particular at least one actuator member which extends and contracts in length along a direction transverse to the axis of the shank and seat. The shank comprises in particular at least two opposed portions separated by a pair of transverse through holes with axes parallel to the direction of extension and of contraction of the actuator member and by a pair of corresponding slits connecting the respective holes to form an open slot which allows the passage between them of the actuator member during the insertion of the shank into the seat of the main body while the actuator member is in a first pre-set position. The two portions of the shank guarantee a large surface of contact with the inside surface of the seat in the main body.

The actuator member is arranged in the main body with the possibility of rotation about an axis parallel to the extension/contraction direction of the same actuator member. This allows the costs of production of the device to be notably reduced compared to those of the known technique since, unlike those already known, there is only one actuator member associated with the main body and not with the supported element.

The shank preferably comprises an internal cavity open toward the free extremity and equipped with conical inside surface portions with axis coincident to those of the pair of through holes present in the shank and with vertices oriented toward the outside of the shank.

According to one possible embodiment, the two separate parts of the actuator member comprise in their turn spherical external surface portions fit to bear against the conical surface portions present in the cavity of the shank. In this way, it is obtained a particularly optimal spatial distribution of the forces acting on the shank to deform elastically.

According to another possible embodiment of the invention, the two separate parts of the actuator member comprise external conical surface portions fit to bear against the conical surface portions present in the cavity of the shank.

According to a possible embodiment, there are means provided to allow the controlled rotation of the actuator member around its own axis, without extension or contraction, between a first pre-set position, in which the supported element can be inserted into, or removed from, the main body, and at least one second pre-set position in which the shank of the supported element remains locked in the seat and the actuator member can be operated in extension or in contraction.

This advantageously confers particular safety of manipulation of the supported element. In fact, during the disassembly, after having loosened the actuator member, it is necessary to intentionally move the actuator member from the second pre-set position up to the first pre-set position, the only one in which the supported element can be effectively removed from the main body.

According to a further embodiment of the invention, means are provided to allow the controlled rotation of the actuator member around its own axis, without extension or contraction, between the first pre-set position, in which the supported element can be inserted into, or removed from, the main body, at least one second pre-set position in which the shank of the supported element remains locked in the seat and the actuator member con be operated in extension or in contraction, as well as at least one third pre-set position, located between the first and the second pre-set positions, in which the supported element is attached without being locked to the main body without the possibility of extraction from the same.

In this case, the safety of manipulation of the device is further guaranteed since, after loosening the actuator member, further rotation of the actuator member brings it without any effort into a third pre-set position, in which it is not possible, however, to detach the supported element from the main body. To achieve this, it is necessary to apply a further deliberate rotation for a few degrees for the purpose of bringing the actuator member from the third pre-set position up to the first pre-set position, in which the supported element can be removed. Thus, the accidental detachment of the supported element from the main body is prevented.

A further advantageous characteristic of the present invention is given by the fact that the holes of the pair of holes and the corresponding slits of the pair of slits that separate the opposed portions of the shank have different dimensions with respect to each other. Likewise, the two parts of the actuator member comprise substantially cylindrical inserting portions, each having its diameter substantially corresponding to each of the holes and of the slits. This allows the supported element to be always positioned with the same pre-set orientation, thus favouring the repeatability of positioning.

According to another particularly advantageous aspect of the present invention, the supported element comprises a projecting circumferential flange having a spherical surface portion fit to bear against a corresponding spherical surface portion that surrounds the seat of the main body.

The axis of the internal conical surface portions set in the inside cavity of the shank and the axis of rotation of the actuator member when the actuator member is in the first pre-set position, are parallel and reciprocally spaced. Therefore, while the necessary axial force of the shank is exercised in the seat acting on the actuator member, the spherical support surfaces provided on the flange and around the seat of the main body allow precise axial alignment of the supported element with respect to the main body and they also simultaneously provide a particularly wide support surface that prevents the entry of dirt and deposits between the mutually connected parts.

Means are also preferably provided to hold in position a locking device engaged in the driving head of the threaded screw arranged in the actuator member when the actuator member is in the first pre-set position, said means allowing the release of the locking device when the actuator member is in the second pre-set position and in full extension condition. This makes manipulation of the device according to the invention even safer, preventing the accidental separation of the locking device during the operations of connecting or removing the supported element.

BRIEF DESCRIPTION OF THE DRAWINGS

These and other features of the invention will be now described in detail with reference to the attached drawings, in which:

FIG. 1 is a longitudinal section view of a device according to a possible embodiment of the present invention;

FIG. 2 is a view partially in section of some elements of the device of FIG. 1 in disassembled condition;

FIG. 3 is a side view of one of the elements that compose the device shown in FIGS. 1 and 2;

FIG. 4 is a section rear view of the element of FIG. 3;

FIG. 5 is an elevation view of an actuator member of the device according to a possible embodiment of the invention;

FIG. 6 is an elevation view of an actuator member of the device according to another embodiment of the invention;

FIG. 7 is a longitudinal section view of the actuator member shown in FIG. 5;

FIGS. 7A and 7B are transverse section views from the respective sides of the plan of section A—A in FIG. 7 of two parts of the actuator member according to a further embodiment of the invention;

FIGS. 8A and 8B are transverse section views of another embodiment of the two parts of the actuator member according to the present invention;

FIG. 16 is a transverse section view of a contracted actuator member with a locking device inserted into the same; and FIG. 17 is a transverse section view of an extended actuator member with a locking tool removed from the same.

MODES FOR CARRYING OUT THE INVENTION

Figure 9:
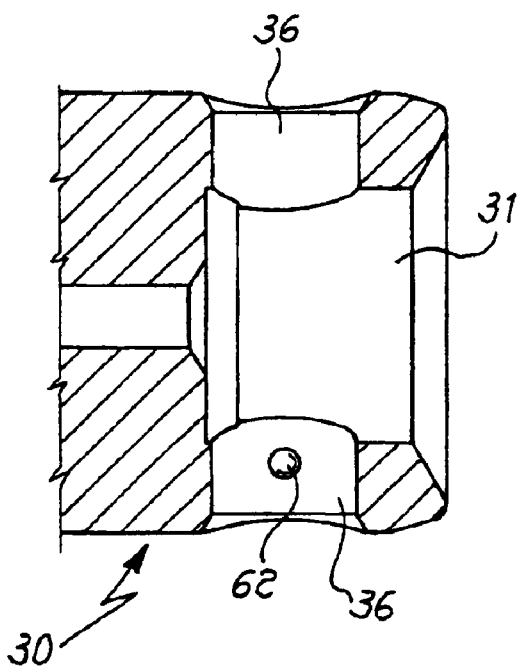
FIG. 9 is a longitudinal section view of the main body according to the embodiment of the invention shown in FIG. 1.
Figure 10:
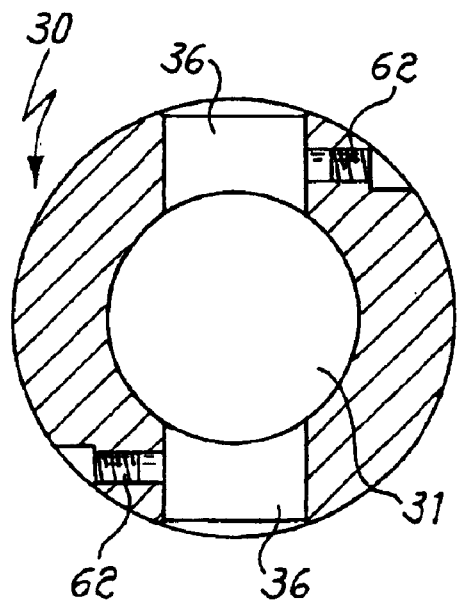
FIG. 10 is a transverse section view of the main body shown in FIG. 9.

FIGS. 1 to 4 show a rigid connection device 10 of the self-aligning type that allows rapid mounting and dismounting of a supported element 20 to and from a main body 30.

The main body 30 comprises in particular a substantially cylindrical seat 31 into which is received a shank 21, also substantially cylindrical with external diameter slightly less than the internal diameter of seat 31, located on an extremity of the supported element 20. The shank 21 is received into the seat 31 with its own axis coincident with the axis of the same seat (common axis 32).

The device according to the present invention comprises means for elastically deforming the shank 21 of the supported element 20 in the form of an actuator member 40 received into the main body 30 with the possibility of rotation around an axis 41, transverse to the axis 32, and with possibility of extension and contraction along a direction parallel to the axis 41.

The shank 21 comprises two opposed portions 22 and 23 separated by a pair of transverse through holes 24 and 25 with axes parallel to the direction of extension and contraction of said actuator member and by a pair of corresponding slits 24' and 25' radiused with the respective holes 24 and 25. In practice, the slits 24' and 25', begin at the free extremity of the shank 21 and they finish in a circular bottom defined by a substantially semicircular portion of the holes 24 and 25 to form open slots that allow the passage of the actuator member 40 between the shank portions 22 and 23 during the insertion of the shank 21 in seat 31 of the main body 30 when the actuator member 40 is in a first pre-set position and in unextended condition. When the actuator member 40 is operated in extension, the external surfaces of the shank portions 22 and 23 come into close contact with the inside surface of the seat 31 thus conferring high torque transmission on the connection between main body 30 and supported element 20.

According to a preferential aspect of the invention, the supported element 20 comprises a projecting circumferential flange 26 with a spherical surface portion 27 fit to bear against a corresponding spherical surface portion 37 that surrounds the seat 31 in the main body 30, in such a way as to favour the correct alignment of the supported element 20 on the main body 30 during the locking between the two components. Alternatively, the surface portions 27 and 37 could have a different form from the spherical one, for instance flat or conical, but the spherical form is however preferable since it guarantees ample support surface without requiring particularly accurate surface machining.

The shank 21 comprises an inside cavity open toward the free extremity and equipped with conical inside surface portions 29 having axes coincident to the pair of through holes 24 and 25 and vertices oriented toward the outside of the same shank. According to a preferential aspect of the present invention, the angle formed between the conical surface and the respective axis is around 30°, in such a way as to give a high multiplication of the force exerted by the actuator member 40 when this is operated in extension.

FIGS. 5, 6 and 7 show some embodiments of an actuator member 40 according to the present invention, which comprise two separate parts 42 and 43 movable with respect to each other along a direction parallel to the axis 41 of the actuator member 40. With reference in particular to the section view of FIG. 7, the actuator member 40 comprises furthermore a double-screw 44 with opposite threading 45 and 46 engaging in corresponding screw threads on the inside of the two parts 42 and 43. On one extremity of the screw 44 a driving head 47 is provided integral with the screw 44.

The opposite threads 45 and 46 are preferably fine pitch threads, with helical angle preferably between 1° and 3°, in such a way as to as to guarantee the maintenance of the locking and so avoid undesired loosening of the actuator member 40 when in extended condition.

According to a first embodiment shown in FIG. 5, the two separate parts 42 and 43 of the actuator member 40 comprise external conical surface portions 48 fit to bear against the conical surface portions 29 inside the cavity of the shank 21 when the actuator member 40 is in extended condition. The conical surfaces 48 also has an angle preferably of around 30° between the same surface and the axis of the cones, coincident with the axis 41 of the actuator member 40. This embodiment gives high multiplication of the forces caused by the actuator member 40 in extended condition against the portions of shank 22 and 23, with consequent transmission of a high pressure to the shank portions 22 and 23 so that their external surfaces enter tightly into contact with the inside wall of the seat 31 in the main body 30.

According to another possible embodiment illustrated in FIG. 6, the actuator member 40 comprises external spherical surface portions 49 instead of the conical surface portions shown in FIG. 5, fit to bear against the conical surface portions 29 present in the cavity of the shank 21 when the actuator member 40 is in extended condition. Beyond presenting the same advantages as the embodiment shown in FIG. 5, the embodiment illustrated in FIG. 6 gives a more uniform distribution perfectly distributed over the entire space of all the forces caused by the actuator member 40 on the shank portions 22 and 23. In other words, all the forces of action and reaction in the points of contact between the spherical surfaces 49 and the conical surfaces 29 are all oriented toward the center, or middle point of the axis 41.

The parts 42 and 43 that compose the actuator member 40 comprise furthermore at least one pair of opposed flat surface portions 50 to allow the passage of the actuator member 40 through the slots formed by the pair of slits 24' and 25' up to the pair of holes 24 and 25 in the shank 21 during the insertion (or the extraction) of the same shank in the seat 31 of the main body 30 while the actuator member 40 is maintained in a first pre-set position, a position in which the flat surfaces 50 are lined up with said slots.

To prevent the mutual rotation of one of the parts with respect to the other when the screw 44 is rotated inside the actuator member 40, one of the parts, for instance the part 43, of the actuator member 40 comprises on one of its extremities a pair of projections 51 which are a sliding fit in a corresponding pair of recesses 52 of complementary shape located on an extremity of the of said other part, in this case the part 42. According to the embodiment illustrated in FIG. 7 and, in greater detail, in the FIGS. 7A and 7B, the projections 51 and the recesses 52 have substantially a rectangular cross-section.

In an alternative embodiment illustrated in the views in section of FIGS. 8A and 8B, in which are shown transverse sections of parts 43' and 42' respectively, the projections 51' and the recesses 52' have cross-section in the form of sectors of a circular crown. Preferably, the angles of the sectors of the circular crown that define the projections 51' and the recesses 52' are all identical and equal to 90°. This embodiment of the actuator member 40 confers better axial stability on the same actuator member when it is in extended condition.

FIGS. 9, 10, 11A and 11B show a first embodiment of the device 10 according to the invention that advantageously comprises means for allowing the controlled rotation of the actuator member 40 around its own axis 41, in such a way as to confer a high degree of safety to the same device.

First of all, the actuator member 40 comprises a groove 55 cut into the external surface of a substantially cylindrical boss portion 56 on each of the two parts and the cylindrical boss portions 56 of the actuator member 40 are received into transverse through holes 36 cut into the main body 30. Each groove 55 is engaged by a sphere 60 maintained in position in the body 30 by means of a screw or grub 61 screwed in a threaded hole 62.

Figure 11A:
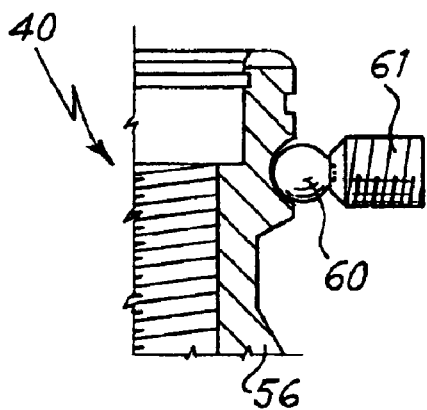
FIGS. 11A and 11B are enlarged views of some details of the device according to the embodiment shown in FIG. 1.
Figure 11B:
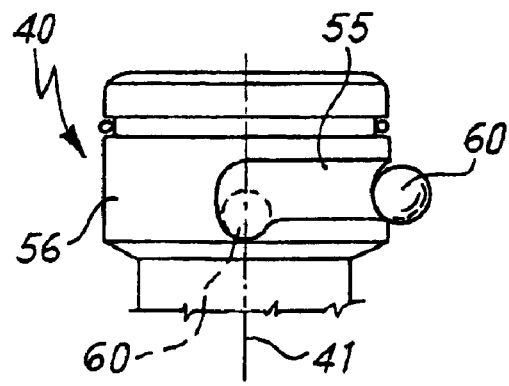
Figure 12:
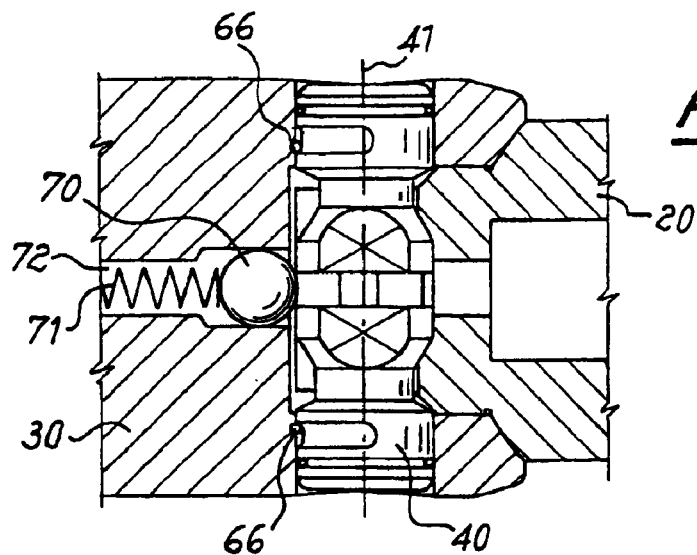
FIG. 12 is a longitudinal section view of another possible embodiment of the present invention.
Figure 13:
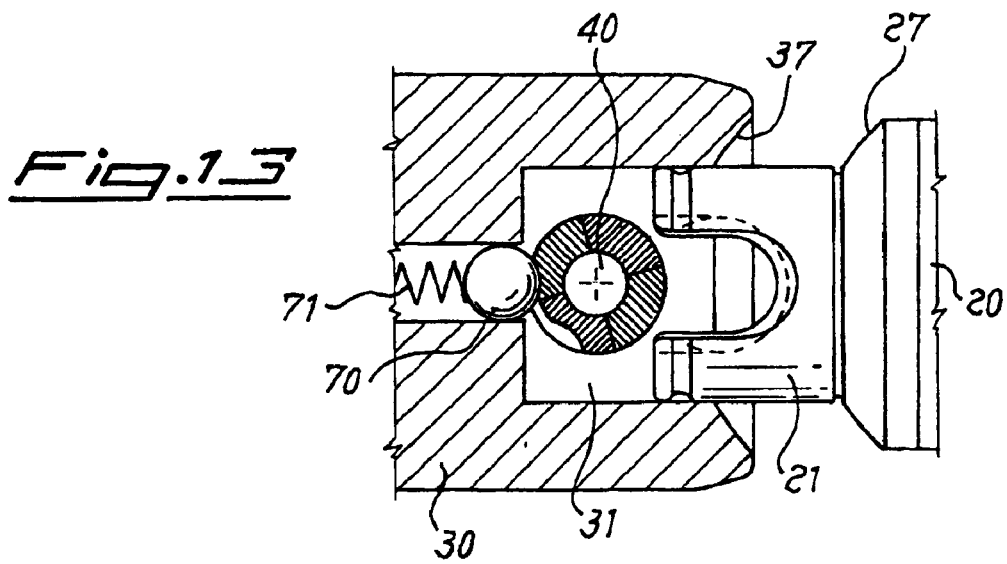
FIG. 13 is a view partially in section of some elements of the device of FIG. 12 in disassembled condition.

As illustrated in FIG. 11B, each groove 55 is 'L'-shaped and is sufficiently wide to keep the sphere 60 engaged in the groove 55 independently of the actuator member 40 being in extended or contracted condition.

When the actuator member 40 is contracted and is in the first pre-set position, in which the supported element 20 can be inserted or removed from the main body 30, the sphere 60 is engaged in the groove 55 in the short part of the 'L' outline, i.e. in the groove that extends parallel to the axis of rotation 41 of the actuator member 40. The sphere 60 is shown outlined by a broken line in this position in FIG. 11B.

When the supported element 20 is being connected to the main body 30, after complete insertion of the shank 21 into the seat 31, the initial rotation of the actuator member 40 about the axis 41 carries the sphere 60 in engagement with the long part of the 'L' outline of the groove 55 and the rotation continues for around a quarter turn until the sphere 60 meets the opposite end of the groove 55, i.e. the extremity of the longer part of the 'L' outline form opposed to the shorter part. This position is identified as the second pre-set position.

It should be noted that, when the shank 21 is completely inserted into the seat 31, the axis 28 of the inside conical surface portions 29 (FIG. 4) in the inside cavity of the shank 21 and the axis of rotation 41 of the actuator member are parallel and slightly spaced one from the other, for instance about 0.1 millimeter. During the extension of the actuator member 40 this small distance is annulled thus exercising the necessary axial traction on the supported element 20 which, together with the shape of the surfaces 27 and 37, produces a connection with the desired characteristics of self-alignment, precision and resistance between the main body 30 and the supported element 20.

In the second pre-set position, corresponding substantially to the position in which the sphere 60 is shown by the unbroken line in FIG. 11B, the actuator member 40 brought into this position prevents the separation of the supported element 20 even though this is not still firmly connected to the main body 30. The continuation of the rotation action in the same direction maintains the actuator member 40 in the second pre-set position but causes the rotation of the screw 44 and the consequent extension of the actuator member 40 by means of mutual separation of the parts 42 and 43 until that extension is reached which is necessary to guarantee locking between the components 20 and 30.

On the other hand, in the case in which the supported element 20 must be removed from the main body 30, the rotation applied the actuator member 40 in the opposite direction with respect to that of locking therefore initially causes the mutual approach of the parts 42 and 43 while the actuator member 40 remains fixed in the second pre-set position. Once the contraction of the actuator member 40 is completed, the last fraction of rotation for a quarter turn causes the rotation of the entire actuator member 40 about its own axis. The operator can thus become aware that the following rotation for a quarter of turn causes the rotation of the actuator member 40, not only because the actuator member 40 when it turns is directly visible from the outside through the through holes 36, but also because of the change in torque needed to be applied to effect the last quarter of turn.

FIGS. 12 to 15 illustrate an alternative embodiment of the means for allowing the controlled rotation of the actuator member 40 between the two pre-set positions already described above and a third pre-set position.

In particular, a groove 65 is provided cut into the external surface of a cylindrical boss portion 56 on each of the two parts of the actuator member 40, also housed in transverse through holes in the main body 30 and substantially identical to the through holes 36 in the main body 30 of the embodiment shown in FIG. 9.

Transverse pins 66, that project toward the interior of the transverse through holes in which the boss portion 56 of the actuator member 40 is inserted free to turn, are engaged in the grooves 65. Compared to the grooves 55 of the embodiment previously illustrated in FIG. 11B, the grooves 65 are substantially linear and stretch peripherally for such length as to allow the actuator member 40 to rotate through about 90°. However, also in this case the grooves 65 are sufficiently wide to maintain engaged with the respective pins 66 independently of whether the actuator member 40 is in extended or contracted condition.

A sphere 70 is furthermore provided that is maintained by a helical spring 71 against a cam surface 75 on the two parts that compose the actuator member 40 in a position substantially central of the same. The sphere 70 and the spring 71 are arranged in a duct 72 preferably having a portion of the housing of polygonal cross-section circumscribing the sphere 70, such as for instance a hexagonal section, to allow the possible passage of a coolant, lubricant or similar fluid destined to reach the supported element 20 or any possible component connected in succession to the same.

Figure 15:
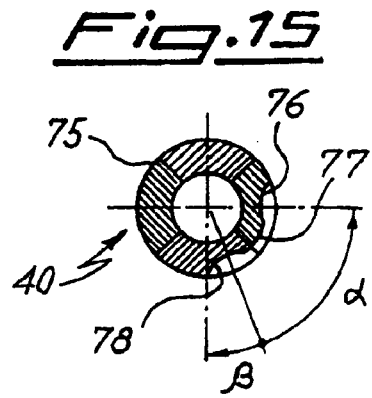
FIG. 15 is a transverse section view of the actuator member shown in FIG. 14.

A section that shows the cam surface 75 in greater detail is illustrated in FIG. 15 and comprises an extremity seating 76 in which the sphere can rest and a first rolling surface portion 77 on one of the two parts of the actuator member 40. The sphere 70 settles in extremity seating 76 when the actuator member 40 is in a second pre-set position, i.e. that in which the supported element 20 is connected to the main body 30 without possibility of extraction from the same.

Figure 14:
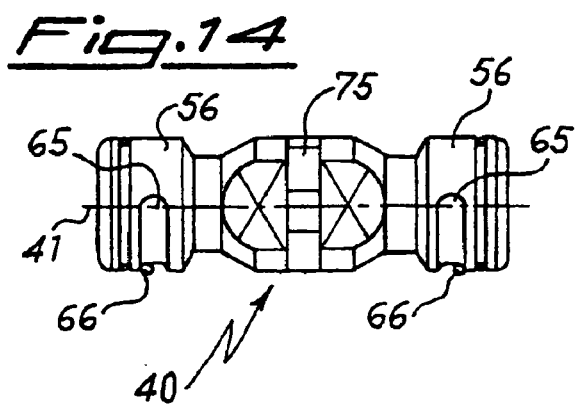
FIG. 14 is a view of an actuator member according to the embodiment of the device shown in FIGS. 12 and 13.

The cam surface continues then onto the other of the two constituent parts of the actuator member 40 of the FIGS. 14 and 15 with a second portion of the rolling surface 77 and finishes with an extremity seating 78. The sphere 70 rests in the seating 78 when the actuator member 40 is in a third pre-set position (position illustrated in FIG. 13), located between the first pre-set position and the second pre-set position. Corresponding to this third pre-set position, the actuator member 40 is in contracted condition but is not completely rotated to the first pre-set position and the shank 21 stays therefore attached without locking in seat 31. In fact α, the angular distance from extremity seating 76 of the cam surface 75 to the other extremity seating 78 is less than 90°, while the angle β that separates the third pre-set position from the first pre-set position represents the complementary angle, i.e. β=(90°-α). In this way, to move the actuator member 40 into the first pre-set position, the only position in which it is possible to withdraw the supported element 20 from the main body 30, the operator must overcome the strength of the spring 71 making the sphere 70 re-enter the lodging duct 72 (position illustrated in FIG. 12) and complete the rotation of a quarter turn of the actuator member 40 to allow the shank 21 to be removed from the seat 31 or, vice versa, re-inserted into seat 31.

Further advantageous characteristics of present invention will be described below with reference to the FIGS. 16 and 17. Above all, the two parts 42 and 43 which compose the actuator member 40 comprise respective inserting portions 2 and 3 substantially cylindrical having different diameter with respect to each other. Equally, the open slot formed by the hole 24 and the slit 24' on the shank 21 will be of such dimension to allow the passage of only one of the inserting portions, for instance the inserting portion 2, but not the inserting portion 3 (or vice versa). In this way the supported element 20 can be connected to the main body 30 always and only in the same position, thus realising a key mechanism that facilitates the repeatability of positioning of the supported element 20.

Always with reference to FIGS. 16 and 17, means are illustrated for facilitating and making safer the manipulation of a locking tool 100. FIG. 16 shows an actuator member 40 in contracted condition with a locking tool 100 inserted into the driving head 47 of the screw 44. The access to the driving head 47 comprises a housing in which are inserted a pair of metal cup springs 90 which contain between them a washer 95 realised in elastically deformable plastic material, for instance in Vulkollan® or similar, with central hole having diameter substantially equal to the circle circumscribed by the cross-section of the locking tool 100. The assembly composed by the cup springs 90 and the washer 95 is retained in the housing in a known way, for instance by means of an spring ring 96 engaged in a suitable internal groove.

In this condition, the cup springs 90, located with coincident orientation, maintain the washer 95 slightly deformed in such a way as that the inside diameter of the latter is slightly reduced. The washer thus exercises a light friction on the locking tool 100 in such a way as to retain the locking tool 100 in position, but without substantially hindering the introduction or voluntary removal of the same locking tool.

FIG. 17 shows the actuator member 40 in the extended condition, i.e. after the locking has been completed. In this condition, the head portion 47 does not any longer exercise pressure on the assembly constituted by the cup springs 90 and the washer 95. The movement of the part 42 away from the head portion 47 is thus sufficient to bring the washer 95 again into its original conformation. This facilitates the extraction of the locking tool 100 at the end of the locking operation.

The connection device according to the present invention finds application in all the cases in which the characteristics of self-alignment, rapid connection and rapid disconnection, and of high-precision mounting are in demand. Examples of such applications could comprise the modular tooling assemblies in machine tools, for instance lathes, millers or machines in which the main body of the device is in turn locked to or integrated with the mandrel of the machine to support a tool. Likewise, the device according to the invention could find application in devices for the rapid and precise connection of the gripping organs of robots in general.

What is claimed is:

1. Detachable rigid connection device comprising at least one main body having a seat, at least a supported element provided with a shank to be received into the seat of said main body and means for elastically deforming said shank and bringing at least two external surfaces of same into contact with an inside surface of said seat, characterized in that said means for elastically deforming said shank comprises at least one actuator member having a length that is extendible and contractible along a transverse direction with respect to an axis of said shank and of said seat.

2. A device according to claim 1, wherein said shank and said seat are substantially cylindrical in form so as to define said axis as coincident and longitudinal.

3. A device according to claim 1, wherein said shank comprises at least two opposed portions separated by a pair of transverse through holes having axes parallel to the direction of extension and contraction of said actuator member and by a pair of corresponding slits radiused with the respective holes to form a corresponding pair of open slots that allow passage between them of said actuator member during insertion of said shank into the seat of said main body while said actuator member is in a first preset position.

4. A device according to claim 1, wherein said shank comprises an inside cavity open toward a free extremity and equipped with inside conical surface portions with axes coincident to said pair of through holes and vertexes oriented toward an outside of said shank.

5. A device according to claim 1, wherein said actuator member is arranged in said main body and rotatable around an axis parallel to the transverse direction of said actuator member.

6. A device according to claim 1, wherein said actuator member comprises at least two separate parts which are movable with respect to each other along a direction parallel to an axis of the actuator member.

7. A device according to claim 6, wherein said actuator member comprises at least one screw with opposed threads engaged in corresponding screw-threads internal to said at least two parts, and at least one driving head integral with said screw and located at an extremity of said screw.

8. A device according to claim 7, wherein said opposed threads on said screw are fine pitch threads.

9. A device according to claim 4, wherein said at least two separate parts of said actuator member comprise external spherical surface portions fit to bear against said conical surface portions in the cavity of said shank when said actuator member is in an extended condition.

10. A device according to claim 1, wherein said actuator member has at least two separate parts that comprise external conical surface portions fit to bear against conical surface portions in an inside cavity of said shank when said actuator member is in an extended condition.

11. A device according to claim 3, wherein said actuator member has at least two separate parts that comprise at least one pair of opposed flat surface portions configured and arranged to allow passage of said actuator member through said pair of silts up to said pair of holes in said shank during insertion of said shank into the seat of said main body while said actuator member is in said first pre-set position.

12. A device according to claim 6, wherein one of said parts of said actuator member has at an extremity at least one projection to be received as a sliding fit into at least one recess of complementary shape located at an extremity of the other of said parts.

13. A device according to claim 12, wherein said at least one projection and said at least one recess have a substantially rectangular cross-section.

14. A device according to claim 12, wherein said at least one projection and said at least one recess have a cross-section in the form of sectors of a circular crown.

15. A device according to claim 12, wherein at least two of said projections are integral with one of said parts and at least two of said complementary recesses cut into the other of said parts.

16. A device according to claim 1, further comprising means for allowing controlled rotation of said actuator member about its own axis, without extension or contraction, between a first pre-set position, in which said supported element can be inserted or removed from said main body, and at least one second pre-set position, in which the shank of said supported element remains located in said seat and said actuator member can be operated in extension or in contraction.

17. A device according to claim 16, wherein said means for allowing the controlled rotation of said actuator member comprises at least one groove on an external surface of a cylindrical boss portion of each of two parts of said actuator member, said boss portions being retained freely rotatable in transverse through holes of said main body, as well as at least one pair of spheres projecting toward an interior of said transverse through holes and engaging in the respective grooves on the portions of boss of the two parts of said actuator member.

18. A device according to claim 1, further comprising means for allowing controlled rotation of said actuator member around its own axis, without extension or contraction, between a first pre-set position, in which said supported element can be inserted or removed from said main body, at least one second pre-set position in which the shank of said supported element remains locked in said seal and said actuator member may be operated in extension or in contraction, and at least one third pre-set position, located between said first and said second pre-set positions, in which said supported element is attached without being locked to said main body and without possibility of separation from the same.

19. A device according to claim 18, wherein said means for allowing the controlled rotation of said actuator member comprises at least one groove on an external surface of a cylindrical boss portion of each of two parts of said actuator member, said boss portions being retained free to turn in transverse through holes of said main body, at least one pair of transverse pins projecting toward an interior of said transverse through holes and engaging in respective grooves on the boss portions of the two parts of said actuator member, as well as at least one sphere engaging, under the action of spring means acting along the direction of the axis of said shank and said seat, with a cam surface cut into said two parts in a substantially central position of said actuator member.

20. A device according to claim 4, wherein axes of said inside conical surface portions are located in the inside cavity of said shank said actuator member having an axis of rotation, the axes and the axis of rotation being parallel and reciprocally spaced while said actuator member is in a first preset position.

21. A device according claim 3, wherein said pair of transverse through holes and the pair of corresponding slits that separate said opposed portions of said shank have different dimensions with respect to each other, and that said actuator member has two parts that comprise substantially cylindrical inserting portions each having a diameter corresponding substantially to each of said holes and each of said slits.

22. A device according to claim 1, wherein said supported element comprises a projecting circumferential flange having a spherical surface portion fit to bear against a corresponding spherical surface portion that surrounds said seat in said main body.

23. A device according to claim 16, further comprising means for retaining in position a locking tool engaged in the driving head of said threaded screw arranged in said actuator member when said actuator member is in said first pre-set position, and means for allowing release of said locking tool when said actuator member is in said second pre-set position.

24. A device according to claim 1, wherein said main body is fixed on a machine.

25. A device according to claim 1, wherein said main body is an integral part of a machine.

26. A device according to claim 24, wherein said machine is a machine tool.

27. A device according to claim 26, wherein said main body is part of a self-aligning modular tool-carrier system for the rapid hookup and unhooking of a tool.

* * * * *